United States Patent [19]

Fransham et al.

[11] Patent Number: 5,378,323
[45] Date of Patent: Jan. 3, 1995

[54] THERMOLYSIS OF PENTACHLOROPHENOL TREATED POLES

[75] Inventors: Peter Fransham; John Rasmussen; Stan Ainslie, all of Calgary, Canada

[73] Assignee: Worthing Industries, Inc., Alberta, Canada

[21] Appl. No.: 94,862

[22] Filed: Jul. 22, 1993

[51] Int. Cl.⁶ ............................................. C10B 53/02
[52] U.S. Cl. ........................................ 201/8; 201/23; 201/29; 201/41
[58] Field of Search .................. 201/4, 8, 20, 23, 29, 201/41, 31; 202/99

[56] References Cited

U.S. PATENT DOCUMENTS

| | | | |
|---|---|---|---|
| 1,510,730 | 10/1924 | Wilcox | 201/29 |
| 3,177,128 | 4/1965 | Vartanian | 201/29 |
| 3,255,070 | 6/1966 | Bersano | 162/26 |
| 3,298,928 | 1/1967 | Esterer | 201/4 |
| 3,771,468 | 11/1973 | Kelly | 110/8 C |
| 3,918,372 | 11/1975 | Schuster | 110/7 R |
| 3,938,449 | 2/1976 | Frisz et al. | 110/8 C |
| 3,977,947 | 8/1976 | Pyle | 201/29 |
| 4,133,273 | 1/1979 | Glennon | 110/346 |
| 4,301,750 | 11/1981 | Fio Rito et al. | 110/346 |
| 4,511,433 | 4/1985 | Tournier et al. | 162/16 |
| 4,576,572 | 3/1986 | Mueller et al. | 432/13 |
| 4,578,147 | 3/1986 | Lindahl et al. | 162/26 |
| 4,666,612 | 5/1987 | Hoffman et al. | 210/768 |
| 4,770,109 | 9/1988 | Schlienger | 110/247 |
| 4,869,825 | 9/1989 | Steiner | 210/634 |
| 4,917,026 | 4/1990 | Greenough | 110/297 |
| 4,977,839 | 12/1990 | Fochtman et al. | 110/346 |
| 5,005,494 | 4/1991 | Schlienger | 110/341 |
| 5,110,364 | 5/1992 | Mazur et al. | 134/2 |
| 5,129,333 | 7/1992 | Frederick et al. | 110/235 |

Primary Examiner—Joye L. Woodard
Attorney, Agent, or Firm—Antonelli, Terry, Stout & Kraus

[57] ABSTRACT

This invention comprises a method and apparatus for removing oil and tar based wood preservatives from sawdust. A pole treated with oil or tar basee wood preservative is shaved to remove the treated outer wood layer, leaving the interior preservative free. The sawdust is subjected to rapid heating in a turbulent oxygen-free gas stream and the oil and tar are rapidly distilled from the sawdust. The sawdust and gas are separated in a mechanical separator and the hot gas is rapidly cooled, condensed and recovered.

6 Claims, 3 Drawing Sheets

THERMOLYSIS OF PENTACHLOROPHENOL TREATED POLES

The present invention relates to a method and apparatus for removing oil and tar based wood preservatives from used utility poles and wooden crossarms mounted thereon. More particularly, the invention is designed to recapture and recycle wood preservatives containing pentachlorophenol and/or creosote.

BACKGROUND OF THE INVENTION

In one province alone, the utility pole companies remove from service approximately 20,000 distribution and 2000 transmission poles per year. At present, disposal practices include reuse by these companies, stockpiling, selling to landscapers and reuse by local farmers. The vast majority of the poles and crossarms (hereinafter referred to as poles) have been treated with pentachlorophenol (PCP) as a means of reducing decay and prolonging the life of the pole. The outer 2.5 centimeters of the pole is impregnated with a solution of 95% carrier oil and 5% PCP. While current legislation does not classify PCP-treated poles as hazardous waste, concern has been raised as to the possible future liability associated with used poles. If the outside material is safely removed and separated for recycling, the preservative-free interior wood can be reused and recycled.

Separation of mixed contaminated substances by means of heating in an oxygen-free environment is termed thermolysis or pyrolysis. Various thermolysis and pyrolysis processes have been developed and are available in the public domain. One type consists of a recirculating hot sand bed, while another comprises a non-circulating sand bed. These processes have the disadvantage of causing abrasive wear to various parts of the machinery and of contaminating the end products with sand particles. These devices have been used primarily for the conversion of wood products and agricultural waste to liquid oils and specialty chemicals.

Another device relies on the oblation of larger wood particles along the sides of a reactor. This device does not alow for the rapid heating of the wood, and hence the outcome is more difficult to predict.

It is an object of the present invention to have rapid heating of the preservative contaminated sawdust and rapid cooling and condensation of the gas without contamination of the clean sawdust by sand.

The present invention uses a fast thermolysis process to rapidly heat the contaminated wood and then rapidly condenses the vapourized wood preservatives to prevent secondary chemical reactions from occurring.

The applicant has conducted laboratory studies which are detailed below. These studies show that PCP can be removed from sawdust to less than natural backgound levels using thermolysis.

Laboratory Analysis

2.1 Scope of Study

The object of the laboratory test was to remove PCP and solvent from treated wood. Table 2.1 lists the four samples tested as part of this study.

TABLE 2.1

| Selection of Materials | |
|---|---|
| Pole Age | PCP Treatment |
| New | No |
| 1992 | Yes |

TABLE 2.1-continued

| Selection of Materials | |
|---|---|
| Pole Age | PCP Treatment |
| 1977 | Yes |
| 1968 | Yes |

PCP is known to vapourize at 310 degrees Centigrade. It was decided that each sample would be subjected to flash distillation at 320 degrees C. to ensure the distillation of the PCP and carrier oil. To determine the effects of temperature a single test was carried out at 360 degrees C. A total of fourteen test were conducted to meet the objectives. The tests are listed on Table 2.2.

TABLE 2.2

| | | Testing Program | | | |
|---|---|---|---|---|---|
| Material | Temperature | PCP | Original | Final | Distillate |
| 1968 | 320 | Yes | X | X | X |
| 1977 | 320 | Yes | X | X | X |
| 1992 | 320 | Yes | X | X | X |
| New | 320 | No | X | X | X |
| 1977 | 360 | Yes | | X | X |

2.2 Methods

Prior to thermal treatment the chips were homogenized in a blender to ensure a uniform dimension of 0.2 cm by 0.02 cm thick. All samples except the untreated wood felt oily and had a distinct hydrocarbon odour. Oil stains on a paper towel were noted after contact with the chips and suggested free oil was present in the sawdust.

2.2.2 Extraction Study

The organic fraction in the sawdust samples was extracted with acetone (in which the chlorophenols are totally soluble) for 24 hours. The extracted materials after removal of acetrone were weighted and submitted for analysis. The sawdust after extraction was dried in a vacuum oven overnight and weighed. The concentration of chlorophenolics and phenol in the extracted materials and the sawdust were calculated.

2.2.3 Thermolysis

The wood chips were heated in a flask under nitrogen atmosphere at two temperatures: approxsimately 320 degrees C. and 360 degrees C. The total heating time was 8 hours. The distillate was condensed in a dry ice container. A trap filled with acetone was attached to the dry ice container to trap any escaped organic compounds. At the end of the thermolysis, the charred wood chips were removed from the apparatus and weighed. The apparatus was rinsed with acetone several times. The washings were combined with the distillate in the dry ice container and the acetone in the trap. After removal of the solvent, the total distillate was weighted and submitted for analysis. The concentration of chlorophenolics and phenol in the distillates and the wood chips was calculated.

2.2.4 Post Thermolysis Extraction

The wood chips after thermolysis were extracted with acetone overnight as described in section 2.2.2. The weight of the wood chips after thermolysis and extraction and drying were measured and recorded. The weight of the extracted materials after removal of the solvent were also measured and recorded. The extracted materials were submitted for analysis.

2.3.1 Product Yields

Table 2.3 lists the product yields for each sample. For samples tested at 320 degrees the approximate yields are 61.5% wood residue, 5.0% distillate and 33.5% non-condensing gas. At the higher temperature of 360 degrees the amount of wood residue decreased to 33.6% while liquid and gas yield increased to 15.6% and 50.8% respectively. The trend of these results is consistent with investigations reported by Scott and Piskorz (1984) in which the quantity of char decreases as a funciton of increasing temperature. Liquid yields and gas yields are also shown to increase with temperature up to approximately 550 degrees C. whereby the liquid yields decreased. At 400 degrees approximately 30% of the wood remained after rapid pyrolysis. Scott and Piskorz (1984) reported their results on a moisture free basis. The results shown in Table 2.3 have been corrected for moisture and hence the non-condensing gas yield is correspondingly higher beacuse of moisture. Scott in other studies has also shown an increase in liquids and a decrease in gas when the rate of pyrolysis is increased. Our tests were run over an eight hour period while fast pyrolysis reactions are normally measured in seconds. Full scale tests would therefore be expected to generate more liquid and less gas than a bench scale apparatus.

TABLE 2.3

| | PRODUCT YIELD THERMOLYSIS | | |
|---|---|---|---|
| | Wood % | Distillate % | NCG % |
| *1968 | 58.90% | 9.50% | 30.70% |
| *1977 | 64.90% | 2.80% | 32.30% |
| *1992 | 64.90% | 2.30% | 32.80% |
| *Untreated | 57.50% | 5.50% | 37.00% |
| **1977 | 33.60% | 15.60% | 50.80% |

*Tested at 320° C.
**Tested at 360° C.
(NCG = Non Condensing Gas)

TABLE 2.4

| | MASS BALANCE | | | | | |
|---|---|---|---|---|---|---|
| Pole | Original Oil | Moisture | Distillate | Extraction | Total | Loss |
| *1968 | 13.4% | 8.30% | 9.50% | 2.3% | 11.80% | 11.9% |
| *1977 | 31.1% | 8.90% | 2.80% | 20.4% | 23.20% | 25.4% |
| *1992 | 28.3% | 4.80% | 2.30% | 24.7% | 27.00% | 4.6% |
| *New | 1.0% | 21.20% | 5.50% | 1.1% | 6.60% | ? |
| **1977 | 31.1% | 8.90% | 15.60% | 0.6% | 16.20% | 47.9% |

*Tested at 320° C.
**Tested at 360° C.

2.3.2 Mass Balance

Table 2.4 shows the percentage of original oil, moisture content, distillate and oil extracted from the wood chips following thermolysis. The column under the title Total is the percentage of oil recovered as distillate and from extraction. Comparison of the original oil column and the total column gives a measure of the losses incurred during testing. It is evident from Table 2.4 that the losses increase with temperature indicating a higher degree of thermal degradation at the higher temperature. Degradation products were not measured but as will be shown later if there was also a loss of PCP, some of the products would consist of chlorine, carbon dioxide and water. Initial moisture content in treated wood is below 10% while the new wood had a moisture content of 21.2%.

Oil recovery (listed under distillate column) is poor for the more recently treated poles during thermolysis at 320 degrees. However the low level of extractable organics at 360 degrees is an indication of a high level of carrier oil removal at the higher temperature.

2.3.4 Cholorphenol Concentrations

Tables 2.5 and 2.6 show the concentration of chlorophenols in the wood chips and the oil fraction before and after thermolysis. Interestingly the new untreated cedar has a measured chlorophenol concentration of 80 ppm suggesting natural occurring chlorophenols in the wood. Thermolysis of new wood reduces the phenols to 20 ppm. Thermolysis at 320 was marginally successful in removing chlorophenols in the 1968 shaving but was not acceptable in the 1977 and 1992 shavings. However at 360 degrees C. the phenol concentration was reduced to approximately half the natural background level.

The level of hydrocarbon and PCP in the wood shavings is between 134,000 ppm to 310,000 ppm and 18,400 ppm to 55,100 ppm respectively. These concentrations exceed landfillable regulations of 1000 ppm for PCP and hence the sawdust would be classified as hazardous and would require disposal at a special waste management facility. The reduction of PCP at higher temperatures means that the sawdust can be disposed of at a normal landfill if no other market for the sawdust can be found.

Initial concentration of phenol in the oil before thermolysis were substantially higher (13.4% to 16.1%) than the reported carrier oil specification of 5% PCP. This increase in PCP relative to the oil could be the result of evaporation of the hydrocarbons or partitioning of the PCP and oil in the wood. From Table 2.6 it can be seen that there has been a significant reduction in the amount of PCP present in the oil distillate following thermolysis. PCP may be reacting with the wood fibre to form other compounds or it could be degrading into its elements and thus becoming part of the non-condensing gas phase.

TABLE 2.5

| | WOOD CHIPS TOTAL PHENOL CONCENTRATION | | | |
|---|---|---|---|---|
| | Before Thermolysis Weight % | PPM | After Thermolysis Weight % | PPM |
| *1968 | 1.84% | 18,400 | 0.013% | 130 |
| *1977 | 5.01% | 50,100 | 2.763% | 27,630 |
| *1992 | 3.78% | 37,800 | 0.236% | 2,630 |
| *New | 0.008% | 80 | 0.002% | 20 |
| **1977 | 5.01% | 50,100 | 0.004% | 43 |

*Tested at 320° C.
**Tested at 360° C.

TABLE 2.6

| | DISTILLATE TOTAL PHENOL CONCENTRATION | | | | |
|---|---|---|---|---|---|
| | Before Thermolysis | PPM | After Thermolysis | PPM | Thermolysis Phenol Recovery |
| *1968 | 13.85% | 138,500 | 6.77% | 67,700 | 48.90% |
| *1977 | 16.10% | 161,000 | 9.70% | 97,000 | 60.20% |
| *1992 | 13.34% | 133,400 | 2.61% | 26,100 | 19.60% |
| *New | 0.82% | 8,200 | 0.11% | 1,100 | 13.40% |
| **1977 | 16.10% | 161,000 | 3.40% | 34,000 | 21.10% |

*Tested at 320° C.
**Tested at 360° C.

The applicant of the present invention has created a mobile thermolysis plant that is capable of removing the oil and PCPs from the impregnated zone of used poles. The process involves the rapid heating of fine-grained materials in an oxygen-free environment and the subsequent recovery of separated solids, liquids and gases.

The first step in the process is to physically remove the impregnated layer from the pole. The poles are collected and the outer 2 to 2.5 centimeters of wood is removed by a pole peeler which consists of rotating knives on a cutter head. The shavings are collected pneumatically and placed into a storage hopper. The shavings are then reduced in size in a hammer mill to 0.05 cubic centimeters. The wood particles must be small enough to be rapidly heated and heavy enough to separate from the gas stream in the cyclone. The resulting sawdust is then subjected to thermolysis.

The wood preservative impregnatied particles are continuously fed into a reactor. Hot oxygen-free gases are fed from an indirect furnace into the reactor and violently mixed with the wood particles. The gas residence time in the reactor is approximately 1 minute at 360 degrees celsius. PCP and carrier oil are quickly vaporized in the reactor.

Thereafter the PCP, oil and sawdust move to a cyclone where the sawdust is mechanically removed. The temperature in the cycleone is held above 360 degrees celsius so that the PCPs and carrier oil are not removed form the vapour state.

Following the cyclone all of the volatile compounds are rapidly quenched. This reduces secondary reactions and avoids degradation of the pentachlorophenol. The mixture of quenched gases is then taken to a venturi scrubber where the PCPs and carrier oil become a condensed distillate. The condensate is then conveyed to a storage facility for recycling.

The remaining hot gases are cooled in a heat exchanger. The byproducts are water and other non-condensible gases. The excess non-condensible gases are valved out of the closed oxygen-free gas recirculating system and flared at the furnace head.

SUMMARY OF THE INVENTION

Therefore, this invention seeks to provide a method of removing pentachlorphenol and creosote from utility poles comprising the steps of: (1) removing an outer wood preservative impregnated surface of said poles by chipping or shaving particles of wood; (2) reducing the size of said wood preservative impregnated particles; (3) conveying the particles into a thermolysis reactor; (4) subjecting the particles to hot oxygen-free gases in said reactor until said wood preservative vapourizes; (5) subjecting said vaporized mixture to a cyclone at a temperature sufficiently high to keep said wood preservative in a vapour state; (6) removing said particles from said cyclone for storage; (7) quenching said wood preservative and gases to a lower temperature and passing said wood preservative and gases through a venturi scrubber; (8) passing a resultant wood preservative condensate through a knockout drum and storing the same for recycling; (9) passing the remainder of said gases through a heat exchanger and removing any condensed water in a knockout drum; (10) flaring any excess gases in a furnace and returing the remainder of said gases to said furnace for movement to said reactor.

This invention also seeks to provide an apparatus for carrying out the method of claim 1 comprising a thermolysis plant; said thermolysis plant including a reactor, a furnace for heating oxygen-free gases, a cyclone, a venturi scrubber, a heat exchanger, a plurality of knockout drums, a plurality of storage drums, a means for moving wood preservative impregnated particles from a storage site into said reactor, a means for moving said oxygen-free gases through said apparatus, a means for removing excess reaction gases, a plurality of oxygen-free gas pipeways, and a plurality of valves and sensors.

BRIEF DESCRIPTION OF THE DRAWINGS

The invention will be further described in greater detail in conjunction with the drawings wherein.

DETAILED DESCRIPTION OF THE INVENTION

Figure 1:
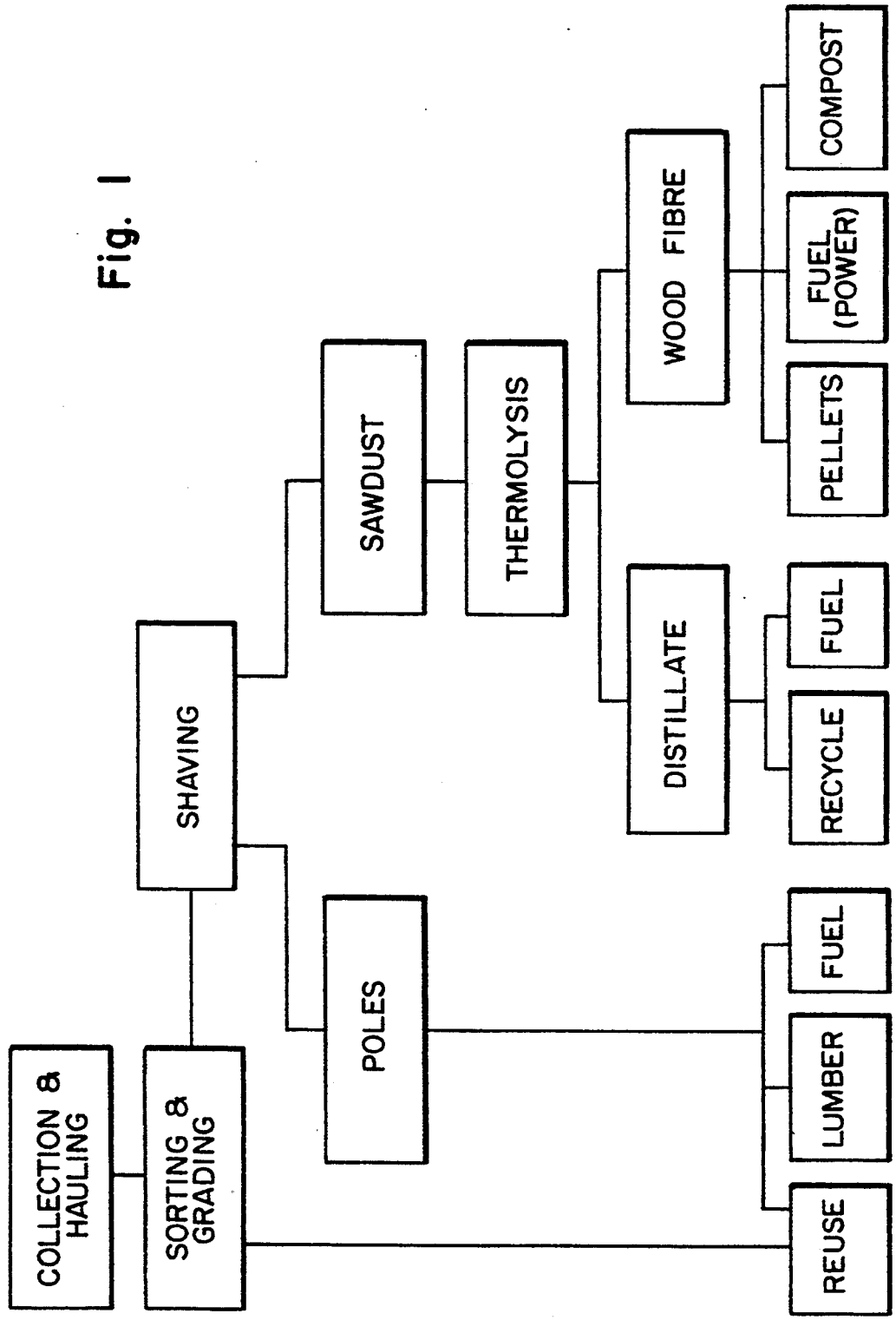
FIG. 1 is a block diagram showing the products of the present invention.

FIG. 1 shows the concept of the used utility pole management program. Poles are collected upon removal from the ground and are shipped to the processing plant. Some poles may be of sufficient quality to return to service without additional processing. All other poles have the outer 2 centimeters of wood removed by a pole peeler.

As seen in FIG. 1, thermolysis produces two liquid phases; an oil PCP phase and a water phase, and a solid phase. The oil PCP phase is of sufficient quality to be recycled as a pole-treating oil. The clean solid phase can be disposed of by landfilling, composting, burning or recycling.

Figure 2:
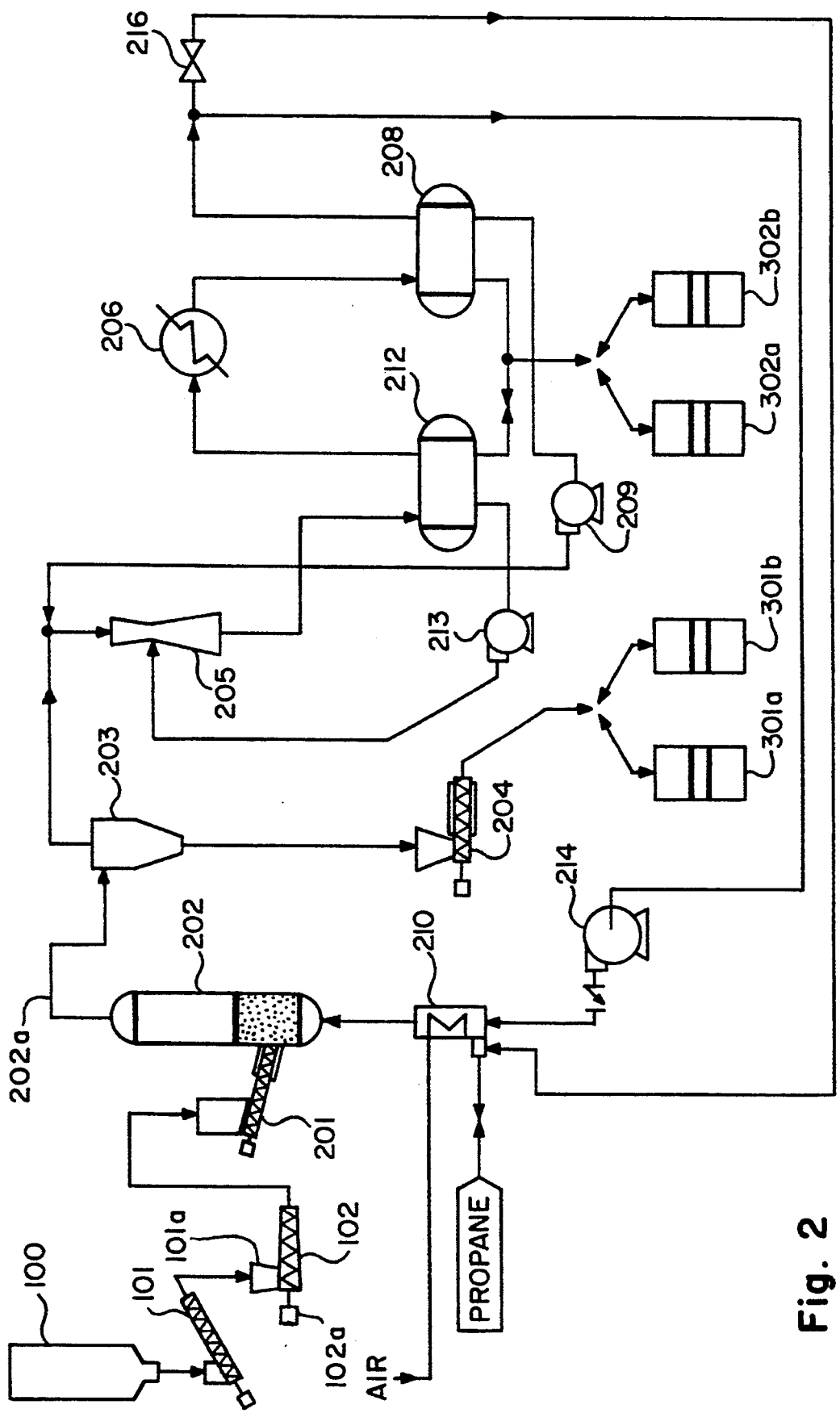
FIG. 2 is a schematic diagram of the apparatus used to carry out the method of the present invention.
Figure 3:
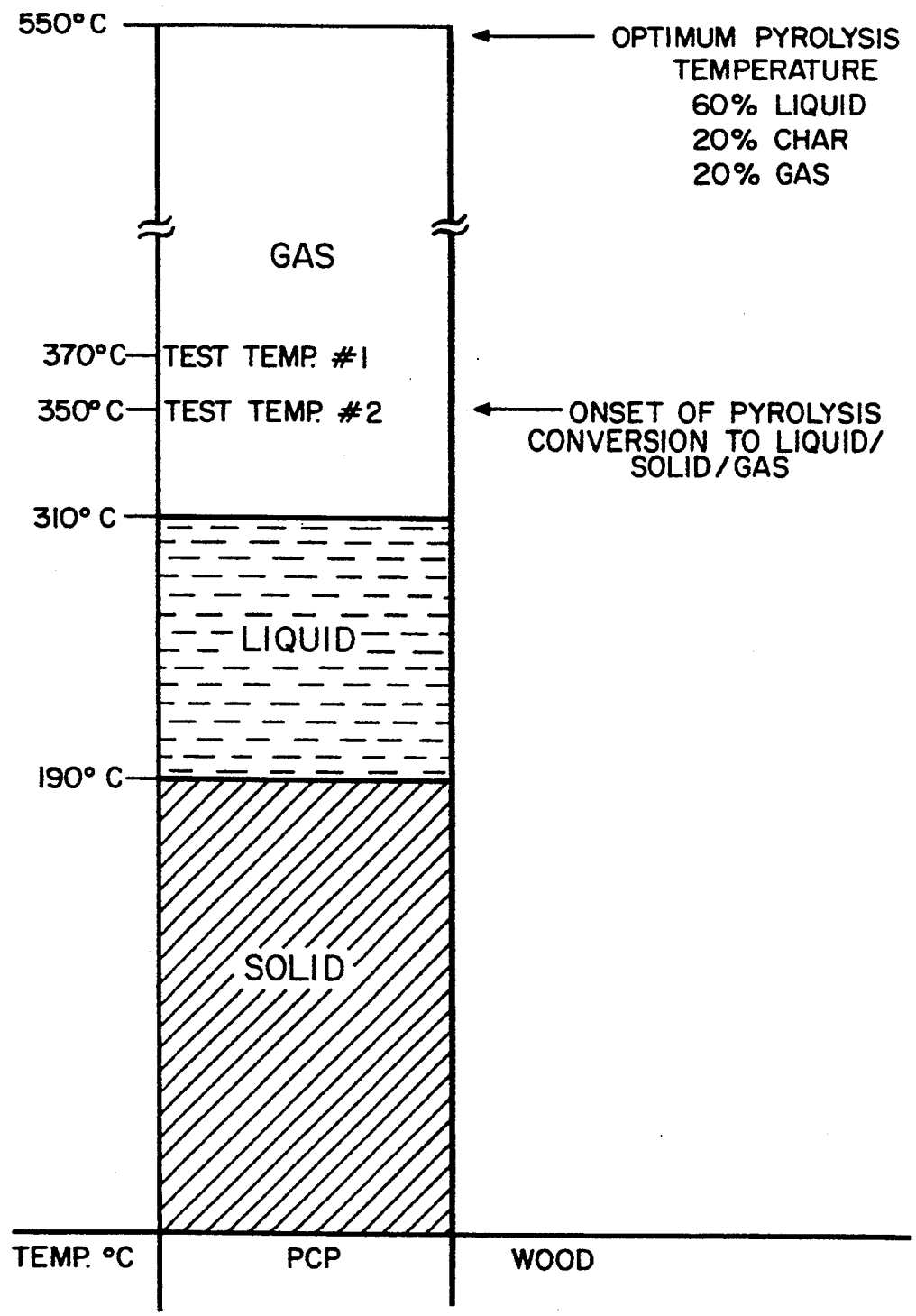
FIG. 3 is a graph showing the three states of pentachlorophenol.

As shown in FIG. 2, contaminated wood shavings are fed into an apparatus of the present invention by bulk storage bags 100 or alternatively they are loaded directly from a storage hopper or by a front end loader. The shavings are pre-processed to ensure maximum particle size does not exceed 0.05 cubic centimeters.

The shavings move by an inclined screw conveyor 101 to a surge bin 101A and then on to a compression screw 102. The compression screw 102 creates a seal between the outside normal atmosphere and the oxygen-free atmosphere inside the reactor 202. The compression screw 102 has a variable speed motor 102A to control the rate of feed arriving at the reactor infeed screw 201. The reactor infeed screw 201 has the capacity greater than that of the compression screw 102 and hence requires no surge bin.

Wood shavings entering the reactor are fluidized by hot oxygen-free gases which are indirectly heated in furnace 210. The inlet to the furnace 210 is connected to the outlet of the compressor 214. The compressor 214 provides fluidizing pressure to move the process oxygen-free gas through the complete system. The temperature of the fluidizing gas entering the reactor 202 is generally set between 700 and 800 degrees celsius. The hot gas and wood shavings are mixed violently in the reactor 202 and the shavings are rapidly heated to 360 degrees C. At 360 degrees C. the carrier oil and pentachlorophenol have vapourized. The gas and wood shavings exit at the top of the reactor 202 and are conveyed pneumatically by a pipe 202A to a cycone 203. The temperature of the cyclone 203 is maintained at 360 degrees C. to prevent early condensation of the carrier oil and PCP. In the cyclone 203 the cleaned wood shavings are separated from the gas. The wood exits at the bottom of the cyclone 203 and is cooled in a water jacketed screw 204 prior to discharge into drums 301A and 301B. The gases, vapourized carrier oil and PCP exit the top of the cyclone 203 and are quenched using liquids pumped from the light fraction knockout drum 208. Rapid quenching quickly reduces the temperature from 360 degrees celsius to approximately 200 degrees celsius.

The gases and distillate then pass through a venturi scrubber 205 where the carrier oil and PCP condense. The gases and condensate leave the scrubber at a temperature of 120 degrees celsius. Fluids used in the venturi scrubber are pumped by a pump 213 from knockout drum 212 to the scrubber 205. The oil and PCP fractions are removed from the gas stream by knockout drum 212 and stored in drums 302A and 302B. Maintaining the temperature above 100 degrees celsius in the knockout drum 212 ensures that most of the water phase will remain as a vapour and only the oil and PCP will condense. Non-condensing gases exit knockout drum 212 and are cooled to 35 degrees celsius in heat exchanger 206. The fraction condensing at 35 degrees celsius is predominantly water and is separated from the non-condensing gas in knockout drum 208.

Operating pressure in the system is less than 30 kilopascals and is maintained by a regulator valve 216. Excess gas is piped from the valve 216 to the furnace 210 where it is flared off at the ambient flame temperature. The process oxygen-free gas is recycled back to the furnace by compressor 214.

Although a specific apparatus for carrying out the method of the present invention has been described, it is understood that any apparatus which carries out the method claims of the invention is embraced by this invention.

What we claim as our invention is:

1. A method of removing pentachlorophenol and creosote from utility poles comprising the steps of:
   (1) removing an outer wood preservative impregnated surface of said poles by chipping or shaving particles of wood;
   (2) reducing the size of said wood preservative impregnated particles;
   (3) conveying the particles into a thermolysis reactor;
   (4) subjecting the particles to hot oxygen-free gases in said reactor until said wood preservative vaporizes;
   (5) subjecting said vaporized mixture to a cyclone at a temperature sufficiently high to keep said wood preservative in a vapour state;
   (6) removing solids from said cyclone for storage;
   (7) quenching said vaporized wood preservative and gases to a lower temperature and passing said wood preservative and gases through a venturi scrubber;
   (8) passing a resultant wood preservative condensate through a knockout drum and storing the same for recycling;
   (9) passing the remainder of said gases through a heat exchanger and removing any condensed water in a knockout drum; and
   (10) reheating and returning the remainder of said gases to said reactor.

2. A method as claimed in claim 1 wherein said wood particles are of a grain size less than or equal to 0.05 cubic centimeters.

3. A method as claimed in claim 1 wherein said wood preservative and hot oxygen-free gas are quenched to a temperature between 120 degrees and 200 degrees celsius after leaving said cyclone.

4. A method as claims in claim 1 wherein said remainder of said gases are subjected to a temperature of approximately 35 degrees celsius in said heat exchanger.

5. A method of removing pentachlorophenol and creosote from utility poles comprising the steps of:
   (1) removing an outer wood preservative impregnated surface of said poles by chipping or shaving particles of wood; said wood preservative including a carrier oil;
   (2) reducing the size of said wood preservative impregnated particles;
   (3) conveying the particles into a thermolysis reactor;
   (4) subjecting the particles to hot oxygen-free gases in said reactor at a temperature of greater than 310 degrees celsius until said wood preservative vaporizes;
   (5) subjecting said vaporized mixture to a cyclone at a temperature sufficiently high to keep said wood preservative in a vapour state;
   (6) removing solids from said cyclone for storage;
   (7) quenching said vaporized wood preservative and gases to a lower temperature and passing said wood preservative and gases through a venturi scrubber;
   (8) passing a resultant wood preservative condensate through a knockout drum and storing the same for recycling;
   (9) passing the remainder of said gases through a heat exchanger and removing any condensed water in a knockout drum; and
   (10) reheating and returning the remainder of said gases to said reactor.

6. A method as claimed in claim 5 wherein the residence time of the wood particles and oxygen-free gases in said reactor is between 0.25 and 2 minutes.

* * * * *